Patented Oct. 20, 1925.

1,558,137

UNITED STATES PATENT OFFICE.

PHILIP L. WOOSTER, OF MANHASSET, NEW YORK; LILLIAN D. WOOSTER ADMINISTRATRIX OF SAID PHILIP L. WOOSTER, DECEASED.

MATERIAL FOR DECOLORIZING LIQUIDS AND PROCESS OF MAKING THE SAME.

No Drawing.   Application filed November 19, 1919.   Serial No. 339,169.

*To all whom it may concern:*

Be it known that I, PHILIP L. WOOSTER, a citizen of the United States, and a resident of Manhasset, Long Island, State of New York, have invented certain new and useful Improvements in Materials for Decolorizing Liquids and Processes of Making the Same, of which the following is a specification.

The most commonly used agent for filtering and decolorizing liquids and particularly sugar, is bone char, otherwise known as bone black or char. Among the properties which chiefly make bone char available for this purpose are, first, its porosity and, second, its relatively large carbon or carbonaceous content. In other words, by virtue of the large area of carbonaceous surface exposed, it is possible for bone char to cause the removal from liquids of large quantities of decolorizing matter.

It is common experience that bone char, after prolonged use, becomes exhausted or spent in so far as its power to extract coloring matter is concerned. When in such a condition, the pores are clogged with matter that cannot pass through them and the carbon has separated out all of the coloring matter that it is capable of retaining. Char which has become thus exhausted is ordinarily discarded as useless, although to some extent it is used for certain industrial purposes, for example, in the manufacture of fertilizer. Nevertheless, exhausted char retains its porous structure unimpaired and one of the objects of my invention is to utilize this porous structure in the manufacture of a decolorizing agent.

It is the object of my invention to produce from exhausted or spent char a product that will possess superior qualities as a decolorizer over ordinary commercial char.

The first step in my process consists in subjecting the exhausted char to a heat of sufficiently high temperature and sufficiently prolonged to bring about as complete combustion as possible, not only of the foreign matter with which the pores are clogged, but also of the combustible matter, particularly the carbon contained in the original structure. I cause the last named action to take place because one means of partially attaining my object consists in replacing the original carbon of the char with carbon in a form which I have found to be even more effective for decolorizing purposes. The result of the heating process is to leave a porous structure relatively free not only from foreign matter, but also from the carbon originally in the bone.

The next step in my process involves the replacement of matter removed by the last mentioned step with carbonaceous matter from an external source. On the other hand this step may be carried out with bone from which the fat has been extracted in any of the several well-known manners such as boiling the bone or dissolving the fat with a suitable solvent. The step now under consideration may be accomplished by mixing the product resulting from the first step with carbonaceous material such as bitumen or other hydrocarbon or animal or vegetable oils or blood and heating the mixture in a retort or closed vessel. The result of the heating process is that the vapors thereby created permeate the char and the finely divided carbon particles are deposited in the minute openings of its structure, thus taking the place of the carbon and other constituents which are eliminated by the heating process.

The impregnating step last described can perhaps be carried out more advantageously by heating the hydrocarbon in a separate retort and allowing the vapors resulting from distillation to be conducted to or passed through the char content in a separate vessel. In either case the vapors are allowed to pass through or are drawn through the char until it is thoroughly permeated and the surfaces of the pores covered with a coating of minute particles of carbon. Whether the char be heated in contact with the hydrocarbon or the hydrocarbon be heated in a separate vessel, it is preferable that the char be in granular form.

Substantially the same process may be followed, if desired, starting with unused char or even with green bone. The usual method of manufacturing a commercial bone char consists, briefly stated, in first removing the fat from green bone by boiling the bone or dissolving the fat with a suitable solvent, such as benzene, then heating the bone under conditions whereby it is protected from free access of air, and then cooling it under similar conditions, the object being to effect incomplete combustion of the carbon. The result is that while the bone is carbonized, it nevertheless retains many constituents, some of which are not only not helpful in decolorizing, but even hinder its process. In my process, on the other hand, as complete a combustion of the carbon as is possible is effected, as I subject the bone or char, as the case may be, to heat sufficiently high or prolonged and with sufficiently free access of air to accomplish this purpose. The carbon and inert and deleterious constituents having been removed, they may be replaced with carbon from an external source in the same manner as in the case of the exhausted char.

It is obvious that in the practice of my invention modifications in detail may be followed and produced. I do not, therefore, wish to be limited to the details above set forth, but what I wish to secure is set forth in the following claims:—

1. The process of making a decolorizing agent for liquids which consists in removing the carbon from bone char by heating and subjecting the resulting product to vapor arising from the incomplete combustion of a hydrocarbon carried on in a separate vessel.

2. The process of making a decolorizing agent which consists in heating exhausted bone char in the presence of air, until substantially complete combustion of the foreign matter and carbon content therein contained has taken place, and subjecting the resulting product to vapor arising from the incomplete combustion of a hydrocarbon carried on in a separate vessel.

3. The process of making a decolorizing agent which consists in heating bone from which the fat has been extracted, in the presence of air, until substantially complete combustion of the combustible matter therein has taken place, and subjecting the resulting product to vapor arising from the incomplete combustion of a hydrocarbon carried on in a separate vessel.

4. The process of making a decolorizing agent which consists in subjecting the porous structure of bone from which substantially all of the combustible matter has been removed to vapor arising from the incomplete combustion of a hydrocarbon carried on in a separate vessel.

5. The process of making a decolorizing agent which consists in subjecting the porous structure resulting from the removal of organic matter from bone to vapor arising from the incomplete combustion of a hydrocarbon carried on in a separate vessel.

6. The process of making a decolorizing agent which consists in removing substantially all of the organic matter from bone and subjecting the resulting product to vapor arising from the incomplete combustion of a hydrocarbon carried on in a separate vessel.

7. The process of making a decolorizing agent which consists in burning the carbon and foreign matter from exhausted bone char and subjecting the resulting product to vapor arising from the incomplete combustion of a hydrocarbon carried on in a separate vessel.

8. The decolorizing agent for liquids comprising the inorganic structure of bone from which the organic matter has been removed, said structure being impregnated with carbonaceous matter of the character carried by the vapors resulting from the incomplete combustion of a hydrocarbon and with substantially no other carbonaceous matter.

9. The decolorizing agent for liquids consisting of the inorganic structure of bone and a covering for the walls of the pores thereof, said covering consisting of carbonaceous matter of the character carried by the vapors resulting from the incomplete combustion of a hydrocarbon and with substantially no other carbonaceous matter.

10. The decolorizing agent for liquids, consisting of the inorganic porous structure of bone, the walls of which are covered with carbonaceous matter from an external source, said carbonaceous matter having a higher carbon content than is obtained from the combustion of the organic constituents of the original bone.

In testimony whereof, I have signed this specification.

PHILIP L. WOOSTER.